(12) United States Patent
Wilson (10) Patent No.: US 6,276,745 B1
(45) Date of Patent: Aug. 21, 2001

(54) GOLF CART ENCLOSURE

(76) Inventor: Frederick George Wilson, 49 Hillsborough Old Rd., BT27 5EW Lisburn, County Antrim (GB)

( * ) Notice: Subject to any disclaimer, the term of this patent is extended or adjusted under 35 U.S.C. 154(b) by 0 days.

(21) Appl. No.: 09/622,551

(22) PCT Filed: Dec. 15, 1999

(86) PCT No.: PCT/EP99/10164

§ 371 Date: Aug. 18, 2000

§ 102(e) Date: Aug. 18, 2000

(87) PCT Pub. No.: WO00/37275

PCT Pub. Date: Jun. 29, 2000

(30) Foreign Application Priority Data

Dec. 18, 1998 (GB) .................................................. 9828032
Jul. 8, 1999 (GB) .................................................. 9915887

(51) Int. Cl.[7] .................................................. B60J 5/06
(52) U.S. Cl. .................. 296/155; 296/147; 280/DIG. 5; 49/426; 49/449
(58) Field of Search ................................. 296/155, 147, 296/77.1, 146.1; 280/DIG. 5; 49/426, 449

(56) References Cited

U.S. PATENT DOCUMENTS

| | | | | |
|---|---|---|---|---|
| 4,932,714 | * | 6/1990 | Chance | 296/148 |
| 5,190,340 | * | 3/1993 | Nuscher | 296/99.1 |
| 5,393,118 | * | 2/1995 | Welborn | 296/147 |
| 5,688,018 | * | 11/1997 | Simpson | 296/77.1 X |

FOREIGN PATENT DOCUMENTS

2201197 * 4/1974 (FR) .

* cited by examiner

*Primary Examiner*—Joseph D. Pape
(74) *Attorney, Agent, or Firm*—Kanesaka & Takeuchi (57) ABSTRACT

A golf cart screen assembly (30) comprises first and second mutually spaced apart rail members (34, 36), at least one protective panel member (38, 40) provided between the first and second rail members, the at least one panel member and the first and second rail members together defining a doorway. The golf cart screen assembly further comprises a door (56) slideably coupled between the first and second rail members and arranged for slideable movement between an open state, in which the doorway is open, and a closed state, in which the doorway is closed.

14 Claims, 7 Drawing Sheets

GOLF CART ENCLOSURE

TECHNICAL FIELD

The present invention relates to a golf cart screen assembly and a golf cart enclosure assembly.

BACKGROUND ART

A golf cart, also commonly known as a golf buggy, is a vehicle for carrying one or more persons and their equipment around a golf course. Typically, a golf cart comprises a cabin area, which includes one or more seats and controls for operating the golf cart, and an equipment storage area which is usually located rearwardly of the cabin area—typically behind the seats.

In most cases, a conventional golf cart also comprises a roof for the cabin area, the roof being supported by a frame connected to the body of the cart. It is also common for a golf cart to include a front windshield or windscreen.

However, such conventional apparatus leave the occupant(s) of the cabin area exposed to the external environment and in particular to inclement weather and insects.

To overcome this problem, it is known to provide a flexible cover or covers, typically made from polyvinylchloride (PVC), which is connectable to the golf cart to shield the cabin occupants from the environment. Zip fasteners, or similar fasteners, are usually provided to allow access to the cabin area but this is considered to be inconvenient for the cabin occupants.

It is also known for a golf cart to have a body which fully encloses the cabin area—similar to that of a conventional car—and has a hinged door at either side. However, such constructions are relatively expensive to manufacture and suffer from a further disadvantage that the doors cannot readily be left open during use. This results in the cabin area becoming unpleasantly hot for the occupants during warm weather.

DISCLOSURE OF THE INVENTION

Accordingly, the present invention provides

A golf cart screen assembly comprising first and second mutually spaced apart rail members; at least one protective panel member provided between the first and second rail members, the at least one panel member and the first and second rail members together defining a doorway; and a door slideably coupled between the first and second rail members and arranged for slideable movement between an open state, in which the doorway is open; and a closed state, in which the doorway is closed.

Preferably, two spaced apart panel members are provided between the first and second rail members, the doorway being defined between the panel members.

Preferably, the doorway is substantially rhomboid in shape.

Preferably, the door is coupled to at least one of the first and second rail members by a roller and roller guide assembly.

Preferably, the door is coupled to at least one of the first and second rail members by a runner and runner guide assembly.

Preferably, at least one of the rail members carries a clamping mechanism arranged for releasably clamping the golf cart screen assembly to a golf cart.

Preferably, the screen assembly is provided with a lock mechanism which comprises a bolt member and a bolt retaining member, one of said bolt member and bolt retaining member being provided on the door, the other being provided on one of the first and second rail members and being arranged for mutual interengagement to lock the door in a predetermined position with respect to the said one of the rail members.

More preferably, the bolt member is resiliently biased to engage with the bolt retaining member.

Preferably, the bolt retaining member comprises a tapered projection defining a cam surface which prevents relative movement between the bolt member and the bolt retaining member in one direction along the rail member.

According to a second aspect of the invention, there is provided two golf cart screen assemblies as claimed in any preceding claim, each screen assembly being adapted for connection to a golf cart and arranged so that, when so connected, the screen assemblies serve to shield the cabin area of the golf cart from the external environment.

Preferably, further includes a rear protective panel member arranged between the two screen assemblies and, in use, located rearwardly of the golf cart cabin area.

Preferably, further includes a hood member arranged between the two screen assemblies to project over the equipment storage area of the golf cart.

More preferably, the hood member is pivotably coupled between the screen assemblies and arranged for pivotable movement between an in-use state, in which the hood member projects over the rear storage area, and a non-use state, in which the hood member is seated on the roof of the golf cart.

Further preferably, resilient biasing means are provided between the hood member and at least one of the screen assemblies, the resilient biasing means being arranged to retain the hood member in whichever of the use or non-use states it adopts.

BRIEF DESCRIPTION OF THE DRAWINGS

An embodiment of the invention will now be described by way of example and with reference to the accompanying drawings in which.

DETAILED DESCRIPTION OF THE DRAWINGS

Figure 1:
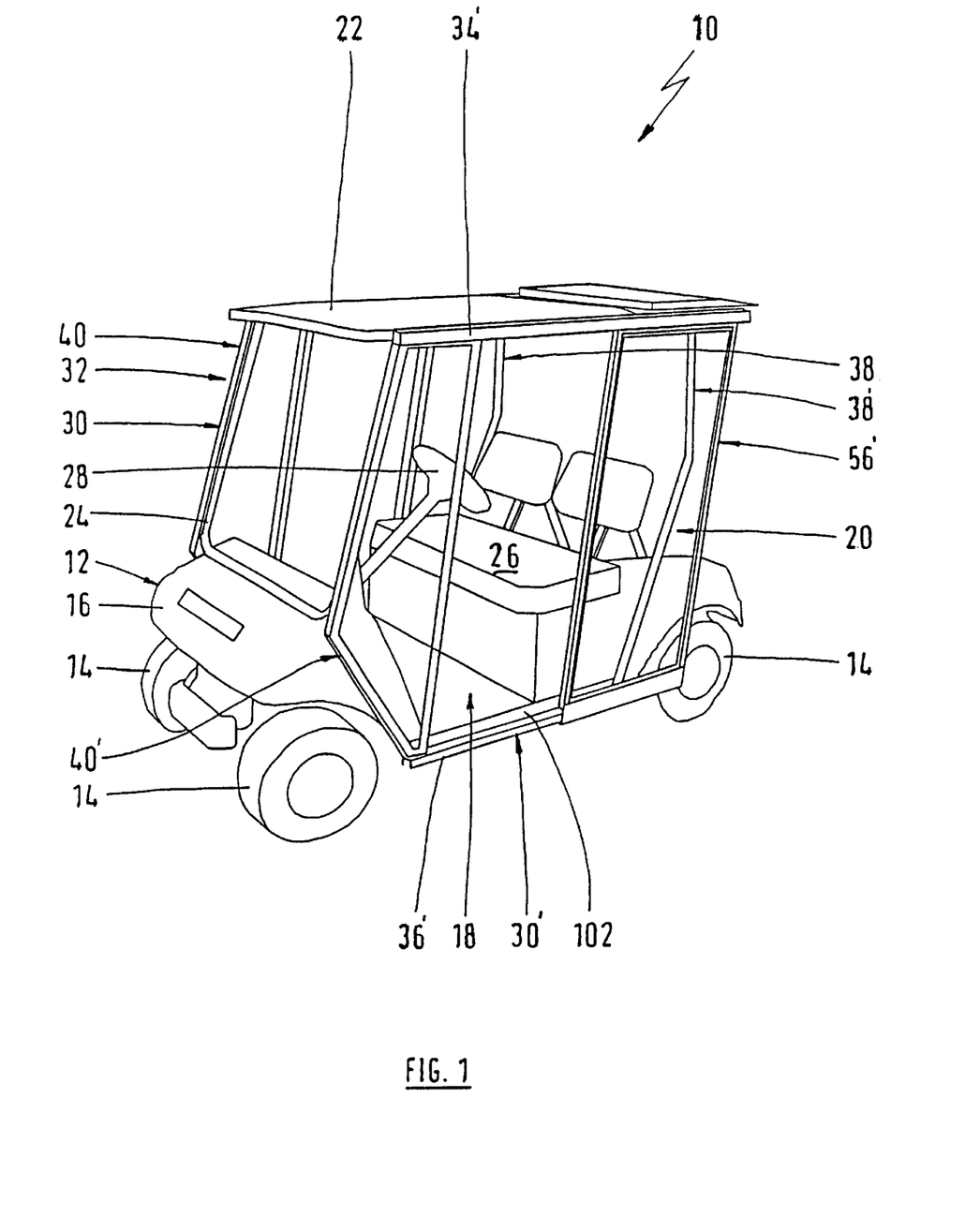
FIG. 1 is a perspective view of a golf cart screen assembly and a golf cart enclosure assembly according to the invention, provided on a conventional golf cart.

Referring now in particular to FIG. 1 of the drawings, there is shown a golf cart, generally indicated at 10, which comprises a body 12 with four wheels 14 (only three visible). The body 12 is shaped to define a front end 16, a cabin area, generally indicated at 18, and a rear storage area, indicated at 20. The golf cart 10 has a roof 22 which is supported above the body 12 by a support frame 24. The cabin area 18 comprises a seat 26 for one or more persons (not shown) and vehicle controls of which only a steering wheel 28 is shown. The golf cart comprises drive means, typically a battery powered electric motor (not shown) also operable from the cabin area 18.

It will be appreciated that the golf cart 10 illustrated in FIG. 1 and described above, is a representative of a typical conventional golf cart 10 and that other forms of conventional golf cart (not illustrated) are equally suitable for use with the present invention as will become apparent from the following description.

A respective golf cart screen assembly 30, 30' according to a first aspect of the present invention is provided on each side of the golf cart 10. The screen assemblies 30, 30' together form part of a golf cart enclosure assembly 32 according to a second aspect of the invention, as is described in more detail below.

Figure 2A:
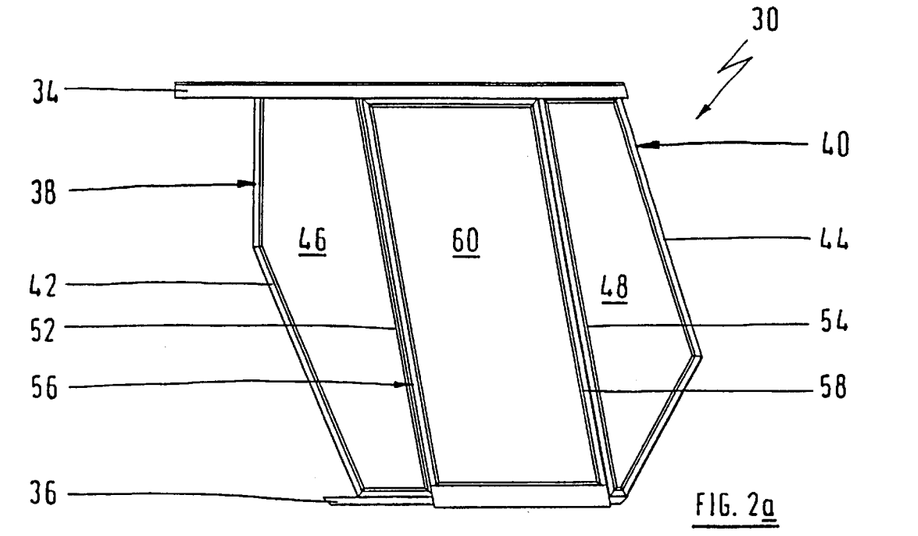
FIG. 2a is a side view of the golf cart screen assembly of FIG. 1, with the door in a closed state.
Figure 2B:
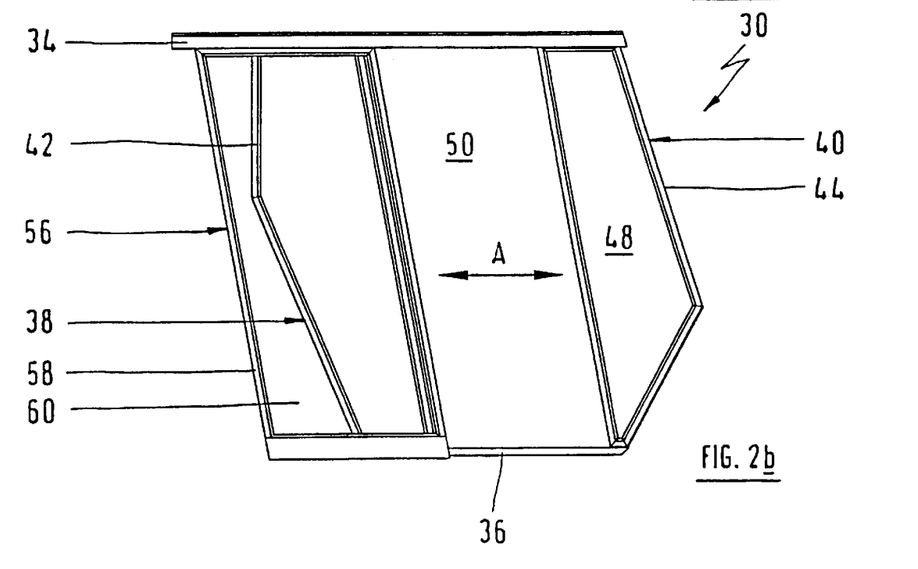
FIG. 2b is a side view of the golf cart screen assembly of FIG. 1 with the door in an open state.

The golf cart screen assembly 30 is now described with particular reference to FIGS. 1 and 2 of the drawings.

The screen assembly 30 comprises first and second mutually spaced apart rail members or rails 34, 36.

The rails 34, 36 are arranged substantially parallelly with one another. First and second protective panel members or protective panels 38, 40 are provided between the first and second rails 34, 36. Each protective panel 38, 40 has a respective frame 42, 44 which carries a respective sheet 46, 48 of protective material. The protective material is preferably a plastics material such as PVC or acrylic and is, advantageously, a transparent material. Alternative protective materials include glass, particularly reinforced glass of the type commonly used in vehicle windshields. The protective material can also take the form of a reticulated or mesh material graded for the exclusion of insects. A skilled person will appreciate that the above list is not exhaustive and other materials are suitable for forming the sheets 46,48. Preferably, however, the material is rigid.

The panels 38,40 are spaced apart from, and are substantially co-planar with, one another. The panels 38,40 and the first and second rails 34,36 thus define a doorway 50. Preferably, the arrangement is such that the respective sections 52,54 of the frames 42,44 which form the doorway 50 are obliquely angled with respect to the rails 34,36 so that the doorway 50 is substantially rhomboidal in shape. This arrangement facilitates access to the cabin area 18 of the golf cart 10 during use.

A door 56 is slideably coupled between the first and second rails 34, 36. The door 56 is shaped and dimensioned to fit the doorway 50 and comprises a frame 58 which, in the illustrated embodiment, is substantially rhomboidal in shape. The frame 58 carries a protective panel 60 which can be formed from the same or similar materials as the protective panels 46,48. It will be apparent that the doorway 50 and therefore the door 56 need not necessarily be rhomboidal in shape. For example, they may take alternative polygon shapes such as that of a rectangle.

The door 56 is disposed in a plane substantially parallel with the common plane of the protective panels 38,40. The door 56 is arranged for a slideable movement along the rails 34,36 in the directions indicated by arrow 'A', between a closed state (FIG. 2a), in which the door 56 closes the doorway 50, and an open state (FIG. 2b) in which the doorway 50 is open. It will be seen from FIG. 2b that, in sliding between the open and closed states, the door 56 passes over the panel 38.

It will be apparent that alternative arrangements of panel, door and doorway are possible. For example, in an alternative embodiment (not illustrated) the screen assembly 30 may comprise only one protective panel and a door, arranged side by side—in such an arrangement the doorway need not necessarily be bounded on all sides, although an option is to provide a post or support (not shown) between the first and second rails, distal the said one protective panel, to define a boundary for the doorway. Alternatively still, the roof supporting frame of the golf cart itself may provide a boundary for the doorway.

Figure 3:
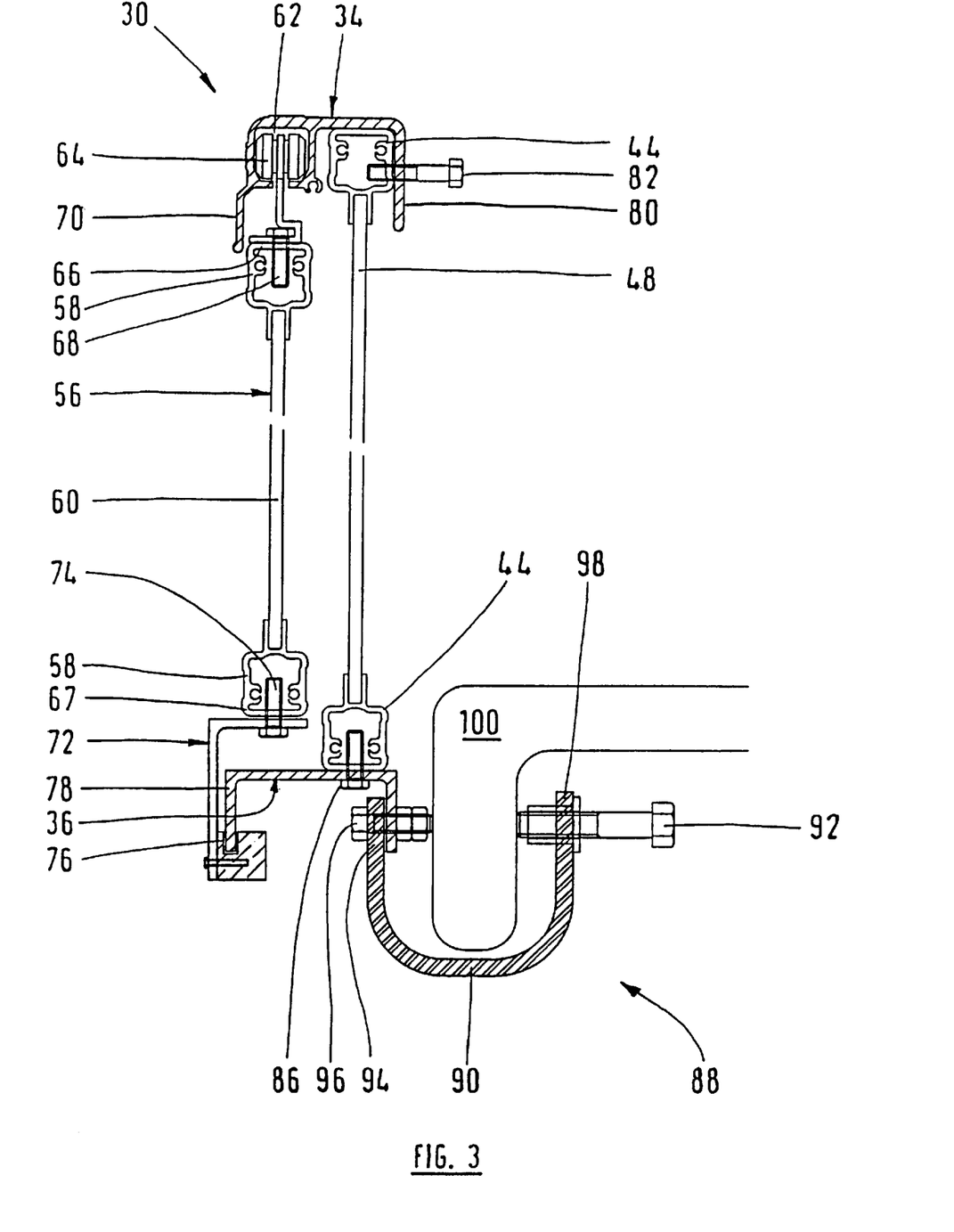
FIG. 3 is a sectional end view of the golf cart screen assembly of FIG. 1.

Referring now to FIG. 3, a section end view of the screen assembly 30 is shown.

The frames 42,44 of the panels 38, and the frame 58 of the door 56 are hollow in the illustrated embodiment and are formed, for example, from plastics by a conventional extrusion process. Alternatively, the frames 42,44,58 may be formed from metal, for example aluminium, or other suitable rigid material.

The first rail 34 is shaped to define a channel, running longitudinally of the rail 34, which serves as a roller guide 62. A co-operating roller 64 is coupled to a top end 66 of the door 56. In the illustrated embodiment, the roller 64 is fixed to the frame 58 by conventional fixing means, for example a bolt 68. Preferably, one or more further rollers (not shown) are similarly fixed to the door 56, spaced apart along its length. A first flange 70 is provided on the rail 34 and extends substantially to the level of the top end 66 of the door 56.

A bottom end 67 of the door 56 is provided with a runner 72, which is for example fixed to the frame 56 by a bolt 74. The runner 72 is provided with a channel or running groove 76.

The second rail 36 has a first flange 78 which is shaped and dimensioned for a slideable engagement with the running groove 76 to act as a runner guide. The running groove 76 and the first flange 78 are slideably interengaged during normal use. Thus, the door 56 is slideable along the rails 34,36 by virtue of the roller 64 and roller guide 62 assembly and the runner 72 and runner guide 78 assembly.

It will be appreciated that, in alternative embodiments, a roller and roller guide may alternatively be used in place of a runner and runner guide and vice versa. Further, the roller may alternatively be provided on the rail and the roller guide may be provided on the door. Similarly, the runner may alternatively take the form of a projection or flange while the runner guide may take the form of a channel or groove.

A second flange 80 is provided on the first rail 34, oppositely disposed to the first flange 70. One end of the frames 42,44 of the protective panels 38,40 (only frame 44 and panel 40 visible in FIG. 3) are seated against the second flange 80 and are fixed thereto by a respective bolt (only one visible 82) or other suitable fixing means. The opposite end of each panel 38,40 is fixed to the second rail 36 by, for example, a bolt 86 or other suitable fixing means, secured through the frame 42,44.

The second rail 36 is provided with a clamping mechanism 88 which, in the illustrated embodiment, comprises a substantially U-shaped bar 90 having a clamping bolt 92. The clamping mechanism 88 is similar in construction and operation to a conventional G-clamp. One end 94 of the U-shaped bar 90 is coupled to the rail 36, by for example a bolt 96, the other end 98 carrying the clamping bolt 92. In use, a portion 100 of the golf cart 10 is seated between the ends 94,98 of the bar 90 and secured therein using the bolt 92. A suitable portion 100 can normally be found adjacent to the sill 102 (FIG. 1) of the cabin area 18.

In use, the first rail 34 can also be clamped to the golf cart 10 using a similar or alternative clamping mechanism (not shown). In the illustrated embodiment, however, the first rail 34 is fixed to the frame 24 of the cart 10 adjacent the roof 22 via bolt 82. Advantageously, in cases where the frame 24 of the golf cart 10 already comprises apertures and bolts for, for example, holding the roof 22 in place, these same bolts and apertures can be used to secure the first rail 34.

This obviates the need to drill or machine any further apertures in the golf cart 10.

The screen assembly 30 can thus readily be mounted on, and demounted from, the golf cart 10. Typically, a user (not shown) can fit or remove a screen assembly 30 in ten minutes or so. The screen assembly 30 is also suitable for retrofitting to existing golf carts 10.

It will be appreciated that the screen assembly 30 may be mounted on a golf cart 10 by other means and may even be permanently or integrally formed with the golf cart.

Figure 4:
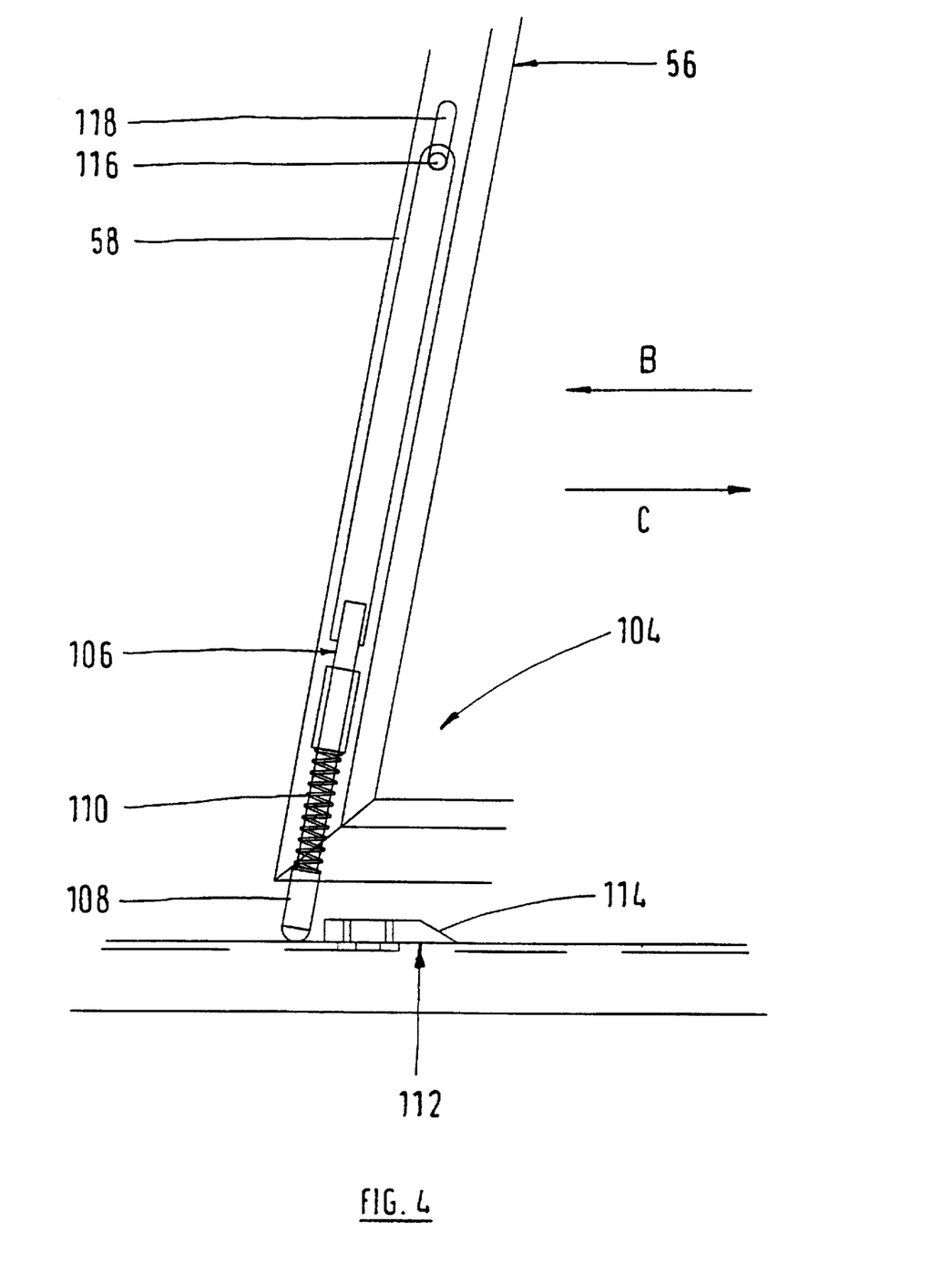
FIG. 4 is a side view of a lock mechanism provided on the golf cart screen assembly of FIG. 1.

Referring now to FIG. 4, a lock mechanism, generally indicated at 104, is provided on the door 56. The lock mechanism 104 comprises a bolt member or locking bolt 106, located within the hollow centre of the frame 58. The locking bolt 106 has one end 108 protruding through an aperture (not shown) in the bottom of the door frame 58. The locking bolt 106 is resiliently biased, by a compression spring 110, such that the end 108 is urged outwardly of the frame 58 towards the second rail 36.

The second rail 36 is provided with a bolt retaining member in the form of a tapered projection or retainer 112. The shape of the retainer 112 defines a cam surface 114 which pushes the locking bolt 106 against the bias of the spring 110 as the door 56 passes over the retainer 112 in the direction indicated by arrow B.

The cam surface 114 is further arranged so that the locking bolt 106, and therefore the door 56, cannot normally pass over the retainer 112 in the direction indicated by arrow C. The retainer 112 thus serves to retain the door 56 in the closed state. A similar, but inverted, retainer (not shown) can also be provided on the rail 36 to hold the door 56 in the open state.

A lug or knob 116 is provided on the locking mechanism 104 to allow a user to lift the bolt 106 against the bias of the spring 110 in order to clear the retainer 112. The knob 116 projects from the bolt 106 and out of the frame 58 via an elongate aperture 118 on the inside of the door 56. A similar corresponding knob (not shown) projects from a similar aperture (not shown) on the outside of the door. It will be appreciated that alternative forms of lock mechanism are also suitable. For example, the lock mechanism may be provided between the door 56 and the first rail 34. Alternatively, the retainer 112 may be replaced by an aperture or recess (not shown) formed in the first or second rail, as appropriate. The lock mechanism need not necessarily be located within the frame 58.

Referring again to FIG. 1, it will be appreciated that the screen assembly 30 of FIGS. 2A and 2B is suited for the left hand side of the golf cart 10 (as viewed in FIG. 1). A substantially similar, but mirror imaged, screen assembly 30' is required for the right hand side of the golf cart 10. When two screen assemblies 30,30' are mounted on the golf cart 10 (as shown in FIG. 1) they together form the golf cart enclosure assembly 32 which serves to shield the cabin area 18, and therefore the occupants (not shown) of the cabin area 18, from the external environment.

The arrangement whereby the door 56 of the screen assembly 30 is slideable between the open and closed states, passing over the protective panel 38, is particularly advantageous since the door 56 is not an obstacle or impediment to the occupants, or to other persons outside of the cabin area 18, if left in the open state. Thus, the door 56 can readily be left, and optionally locked, in the open state while the cart is in use. This is particularly desirable in hot weather. Further, the screen assembly 30 is relatively inexpensive to manufacture and may readily be retrofitted to an existing golf cart.

Figure 5:
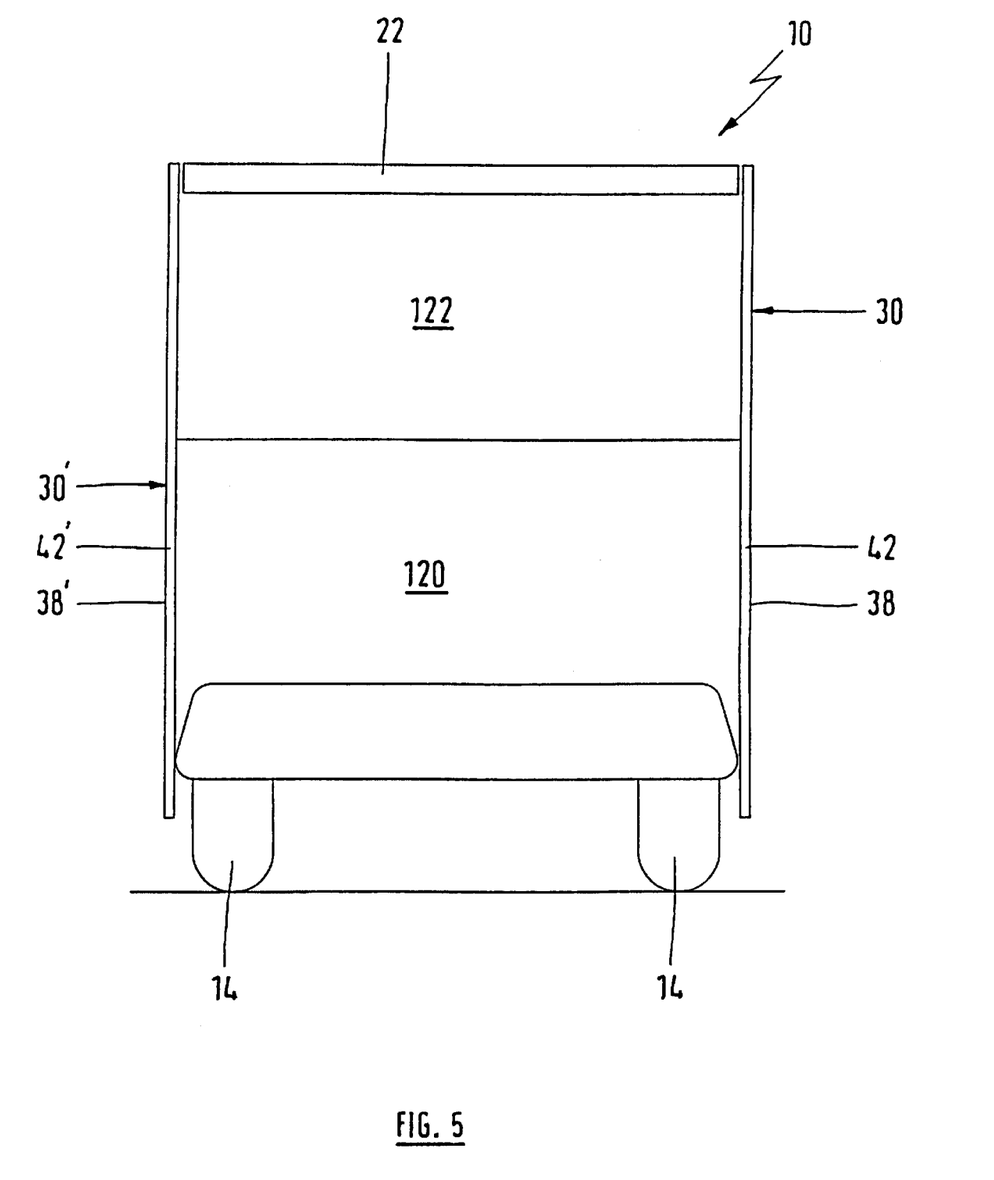
FIG. 5 is a rear view of the golf cart screen assembly, the golf cart enclosure assembly and the golf cart of FIG. 1.

Referring now to FIG. 5, the golf cart enclosure assembly 32 can be supplemented by the provision of one or more rear protective panel members. In FIG. 5, a first, fixed rear panel 120 and a second, removable rear panel 122 are shown. The fixed rear panel 120 is fixed between the respective frames 42, 42' of the protective panels 38, 38'. The removable rear panel 122 is fitted above the fixed rear panel 120, between the panels 38, 38'. The removable rear panel 122 is held in position by conventional clip means (not shown) so that it can be removed if desired, for example on a hot day. Preferably, the rear panels 120,122 are made from transparent material, for example acrylic.

Figure 6A:
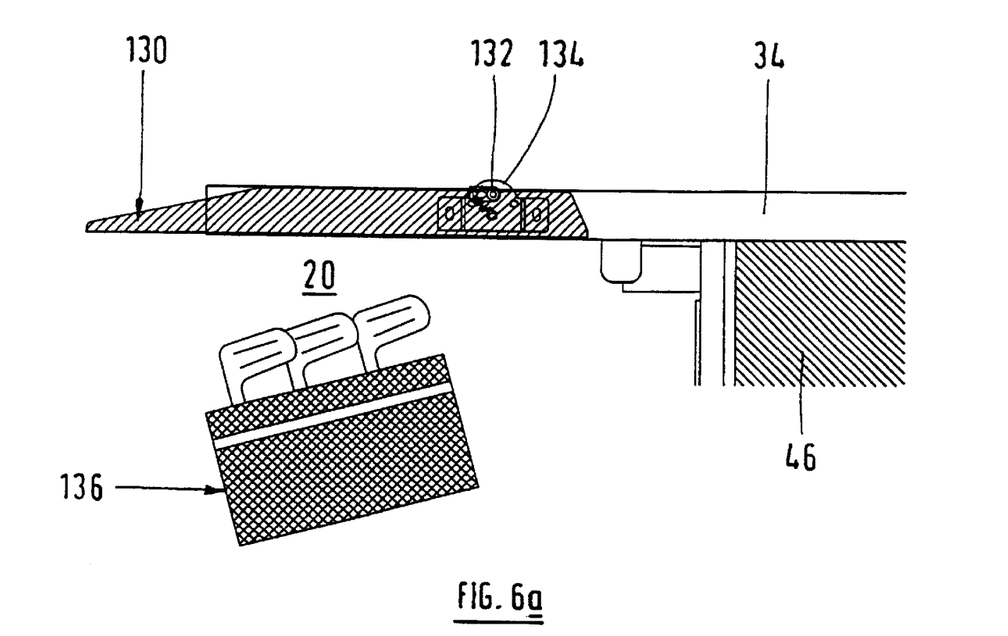
FIG. 6a is a side view of a hood in a use state.
Figure 6B:
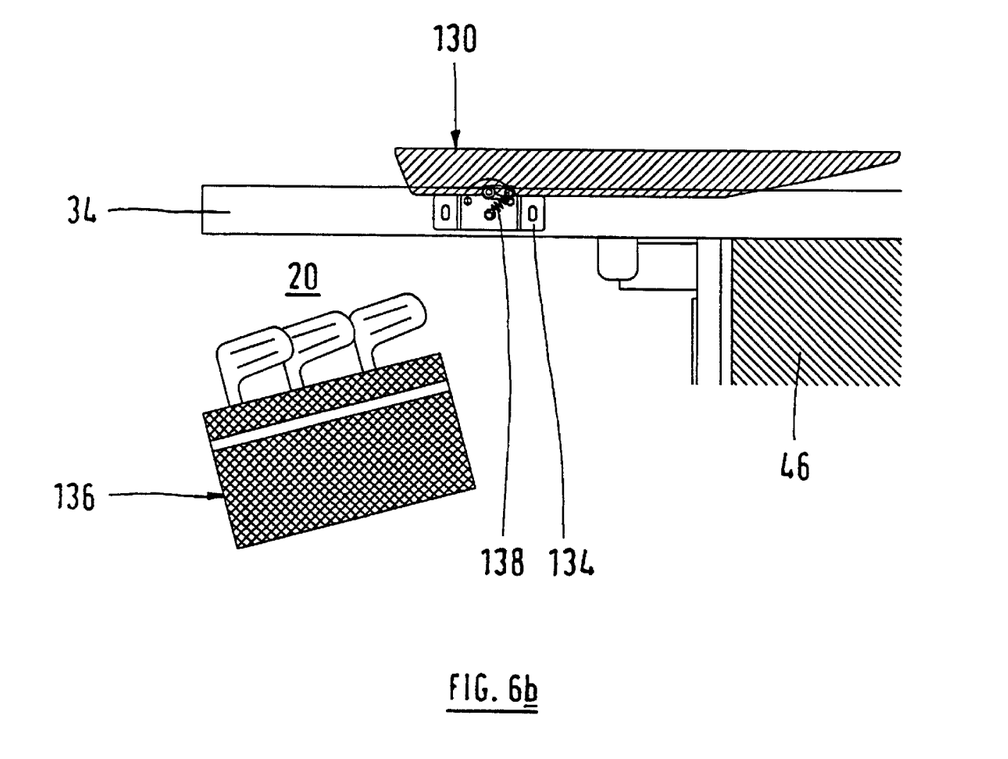
FIG. 6b is a side view of the hood in a non-use state.
Figure 7:
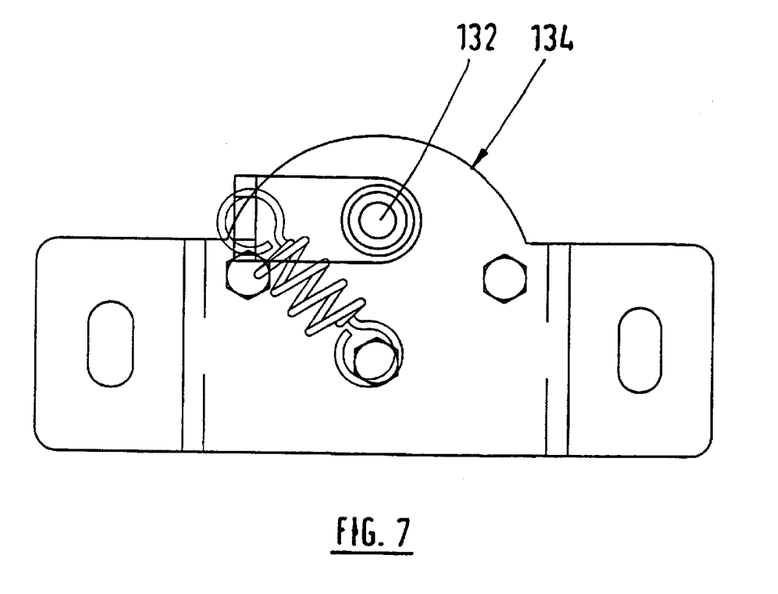
FIG. 7 is a detail of FIGS. 6a and 6b.
Figure 8:
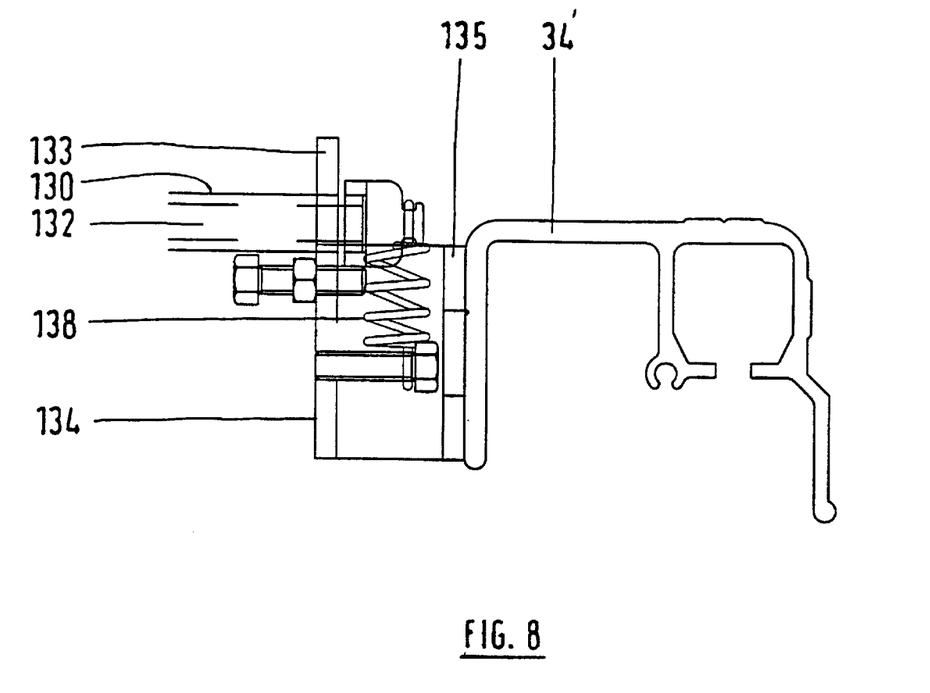
FIG. 8 is an end view of the detail of FIG. 7.

Referring now to FIGS. 6–8, a common problem with playing golf in the rain is that the golf equipment 136 becomes wet and, in particular, the golf club grips (not shown) become slippery. Golf bags are commonly provided with flexible hoods but these are unfavoured by many golfers as they restrict access to the clubs. Conventionally, golf carts make no provisions for shielding golf clubs and other equipment from the rain.

To overcome this problem, the golf cart enclosure assembly 32 of the present invention preferably includes a hood member or hood 130 arranged between the screen assemblies 30,30' to project, in use, over the rear or equipment storage area 20 of the golf cart 10. The hood 130 is preferably formed from a rigid material, such as plastics, and is pivotably coupled between the respective first rails 34,34' of the screen assemblies 30,30'. To this end, the hood 130 is provided with an axle 132 each end of which is journaled in one leg 133 of a respective U-shaped bracket 134 (only one shown). The other leg 135 is bolted to the respective rail 34,34'.

The hood 130 is pivotable between a use state (FIG. 6a), in which the hood 130 projects over the rear storage area 20, and a non-use state (FIG. 6b) in which the hood 130 is seated on the roof 22 (hidden in FIGS. 6a and 6b by the rail 34) of the cart 10.

Preferably, the hood 130 is shaped, by, for example a conventional vacuum forming process, to correspond substantially with the shape of the roof 22 of the cart 10 so that it fits neatly thereon.

Clearly, in the use state, the hood 130 shields the contents of the rear storage area 20, for example golf clubs 136 as shown in FIGS. 6a and 6b, from rain.

Preferably, respective resilient biasing means, for example a tension spring 138 is provided between each bracket 134 and the hood 130 in an over-centre arrangement whereby the spring 138 serves to maintain the hood 130 in whichever of the use or non-use states it adopts.

A handle (not shown) may be provided on the axle 132 to facilitate operation of the hood 130.

It will be appreciated that the hood 130 may be coupled between the rails 34,34' by other conventional means. For example, the axle 130 may be mounted directly on the rails 34,34' without the need for a bracket 134.

What is claimed is:

1. A golf cart screen assembly comprising first and second mutually spaced apart rail members; at least one protective panel member provided between the first and second rail members, the at least one panel member and the first and second rail members together defining a doorway; and a door slideably coupled between the first and second rail members and arranged for slideable movement between an open state, in which the doorway is open; and a closed state, in which the doorway is closed.

2. A golf cart screen assembly as claimed in claim 1, wherein two spaced apart panel members are provided between the first and second rail members, the doorway being defined between the panel members.

3. A golf cart screen assembly as claimed in claim 1 or 2, in which the doorway is substantially rhomboid in shape.

4. A golf cart screen assembly as claimed in claim 1 or 2, in which the door is coupled to at least one of the first and second rail members by a roller and roller guide assembly.

5. A golf cart screen assembly as claimed in claim 1 or 2, in which the door is coupled to at least one of the first and second rail members by a runner and runner guide assembly.

6. A golf cart screen assembly as claimed in claim 1 or 2, in which at least one of the rail members carries a clamping mechanism arranged for releasably clamping the golf cart screen assembly to a golf cart.

7. A golf cart screen assembly according to claim 1 or 2 in which the screen assembly is provided with a lock mechanism which comprises a bolt member and a bolt retaining member, one of said bolt member and bolt retaining member being provided on the door, the other being provided on one of the first and second rail members and being arranged for mutual interengagement to lock the door in a predetermined position with respect to the said one of the rail members.

8. A golf cart screen assembly as claimed in claim 7, in which the bolt member is resiliently biased to engage with the bolt retaining member.

9. A golf cart screen assembly as claimed in claim 7 in which the bolt retaining member comprises a tapered projection defining a cam surface which prevents relative movement between the bolt member and the bolt retaining member in one direction along the rail member.

10. A golf cart enclosure assembly comprising two golf cart screen assemblies as claimed in claim 1 or 2, each screen assembly being adapted for connection to a golf cart and arranged so that, when so connected, the screen assemblies serve to shield the cabin area of the golf cart from the external environment.

11. A golf cart enclosure assembly as claimed in claim 10, which further includes a rear protective panel member arranged between the two screen assemblies and, in use, located rearwardly of the golf cart cabin area.

12. A golf cart enclosure assembly as claimed in claim 10, which further includes a hood member arranged between the two screen assemblies to project over the equipment storage area of the golf cart.

13. A golf cart enclosure assembly as claimed in claim 12, wherein the hood member is pivotably coupled between the screen assemblies and arranged for pivotable movement between an in-use state, in which the hood member projects over the rear storage area, and a non-use state, in which the hood member is seated on the roof of the golf cart.

14. A golf cart enclosure assembly as claimed in claim 13, wherein resilient biasing means are provided between the hood member and at least one of the screen assemblies, the resilient biasing means being arranged to retain the hood member in whichever of the use or non-use states it adopts.

* * * * *